United States Patent Office 2,805,256
Patented Sept. 3, 1957

2,805,256

O-(HALOPHENYL) ETHYLENE DIIMINOPHOS-PHINOTHIOATES

Henry Tolkmith and Edgar C. Britton, Midland, Mich., assignors to The Dow Chemical Company, Midland, Mich., a corporation of Delaware No Drawing. Application April 5, 1956,
Serial No. 576,257

4 Claims. (Cl. 260—606.5)

This invention is concerned with the O-(halophenyl) ethylene diiminophosphinothioates having the formula

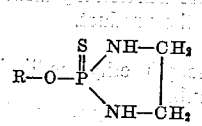

In this and succeeding formulas, R represents a halophenyl radical containing at least two halogen substituents selected from bromine or chlorine. These new compounds are crystalline solids, somewhat soluble in many organic solvents and of very low solubility in water. They have been found to be effective as fire retardants and are adapted to be employed for the treatment of normally flammable cellulosic materials to increase their resistance to combustion and burning. The compounds are also useful as parasiticides and adapted to be employed as active toxic constituents of compositions for the control of bacteria, mites, and insect pests such as aphids.

The new compounds may be prepared by reacting ethylene diamine with an O-(halophenyl) phosphorodichloridothioate of the formula

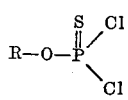

The reaction takes place smoothly at the temperature range of from $-10°$ C. to $35°$ C. with the formation of the desired product and diamine hydrochloride of reaction. Good results are obtained when employing at least two molecular proportions of diamine with each molecular proportion of the phosphorodichloridothioate reagent. The reaction is somewhat exothermic and the temperature may be controlled by regulating the rate of contacting the reactants and by external cooling. The reaction is carried out in the presence of an inert organic solvent such as benzene, carbon tetrachloride or ethylene dichloride. Upon completion of the reaction, the desired product may be separated in conventional fashion.

In carrying out the reaction, ethylene diamine is contacted portionwise with the phosphorodichloridothioate reagent dissolved in the reaction solvent. The contacting is carried out with stirring and at a temperature of from $-10°$ C. to $35°$ C. In an alternative procedure, the reactants are contacted slowly portionwise one with the other in the reaction solvent. Upon completion of the reaction, the reaction mixture is washed with water and the water immiscible solvent removed by evaporation or fractional distillation under reduced pressure to obtain the desired product as a crystalline residue.

The following examples illustrate the invention but are not to be construed as limiting.

EXAMPLE 1

*O-(2,4,5-trichlorophenyl) ethylenediiminophosphinothioate*

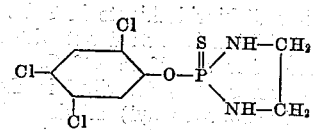

Two moles (400 milliliters) of O-(2,4,5-trichlorophenyl) phosphorodichloridothioate and 4.4 moles (300 milliliters) of ethylene diamine were added simultaneously from separate dropping funnels to 9 liters of ethylene dichloride. The addition was carried out gradually with stirring over a period of one hour and at a temperature of from $20°$ to $35°$ C. Following the addition, the reaction mixture was washed with water. The ethylene dichloride was then removed from the washed product by evaporation to obtain an O-(2,4,5-trichlorophenyl) ethylenediiminophosphinothioate product as a crystalline residue. This product was a white solid having a melting point of $156°–158°$ C.

EXAMPLE 2

*O-(2,4,6-trichlorophenyl) ethylenediiminophosphinothioate*

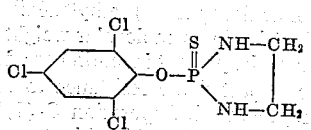

A solution of 99 grams (0.3 mole) of O-(2,4,5-trichlorophenyl) phosphorodichloridothioate in 500 milliliters of ethylene dichloride and a solution of 40.5 grams (0.66 mole) of ethylene diamine in 250 milliliters of ethylene dichloride were added simultaneously from separate dropping funnels to 100 milliliters of ethylene dichloride. The addition was carried out with stirring over a period of one hour and at a temperature of $15°$ C. The reaction mixture was then processed as described in Example 1 to obtain an O-(2,4,6-trichlorophenyl) ethylenediiminophosphinothioate product as a crystalline solid. After recrystallization from methanol, this product had a melting point of $206°–208°$ C.

EXAMPLE 3

*O-(2,4,6-tribromophenyl) ethylenediiminophosphinothioate*

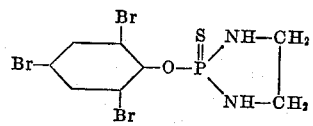

Ethylene diamine (6.8 grams, 0.11 mole) was added slowly to a solution of 26 grams (0.05 mole) of O-(2,4,6-tribromophenyl) phosphorodichloridothioate in 500 milliliters of ethylene dichloride. The addition was carried out with stirring over a period of 30 minutes and at a temperature of from $10°$ to $15°$ C. The reaction mixture was then processed as described in Example 1 to obtain an O-(2,4,6-tribromophenyl) ethylenediiminophosphinothioate product as a crystalline residue. This product was recrystallized from methanol and found to melt at $221°–223°$ C.

EXAMPLE 4

*O-(2,4-dichlorophenyl) ethylenediimino-phosphinothioate*

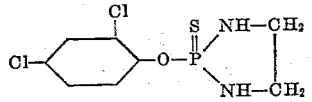

Ethylene diamine (0.4 mole) is added over a period of 0.5 hour to a solution of 0.2 mole of O-(2,4-dichlorophenyl) phosphorodichloridothioate in 200 milliliters of benezene. The addition is carried out with stirring and at a temperature of from 10° to 20° C. The reaction mixture is then processed as described in Example 1 to obtain an O-(2,4-dichlorophenyl) ethylene diiminophosphinothioate product as a white crystalline solid having a molecular weight of 252.

EXAMPLE 5

*O-(pentachlorophenyl) ethylenediiminophosphinothioate*

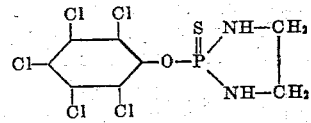

Ethylene diamine (0.4 mole) is added to a solution of 0.2 mole of O-(pentachlorophenyl) phosphorodichloridothioate in 200 milliliters of toluene. The addition is carried out with stirring over a period of 30 minutes and at a temperature of from 5° to 15° C. The reaction mixture is then processed as described in Example 1 to obtain an O-(pentachlorophenyl) ethylenediiminophosphinothioate product having a molecular weight of 358.5.

The products of the present invention are five retardants and adapted to impart flame resistance to cellulosic materials. In a representative operation O-(2,4,6-trichlorophenyl) ethylenediiminophosphinothioate was employed for increasing the resistance of thin panels of wood to combustion. In such operations dry 1/20 inch birch face veneer panels were impregnated with the diiminophosphinothioate compound in an amount equal to 3.9 percent by weight of the wood panel. The panels were then subjected to the flames produced by the burning of one milliliter of alcohol about 1/4 inch below the panel surfaces. As a result of this operation, the treated panels were found to be completely resistant to combustion. Untreated panels, when subjected to the same test, burst readily into flames and were completely consumed thereby.

The O-(halophenyl) phosphorodichloridothioates employed as starting materials may be prepared by reacting a molecular excess of phosphorus thiochloride with an alkali metal salt of a suitable halophenol. Good results are obtained when employing from two to four moles of $PSCl_3$ per mole of the alkali metal phenolate. The phenolate, preferably as the sodium salt, is added portionwise with stirring to the phosphorus trichloride and the mixture subsequently warmed for a short time to complete the reaction. The crude reaction mixture is filtered and the filtrate fractionally distilled under reduced pressure to separate the product.

We claim:

1. An O-(halophenyl) ethylenediiminophosphinothioate having the formula $$\underset{\underset{NH-CH_2}{NH-CH_2}}{R-O-\overset{\overset{S}{\|}}{P}}$$

in which R represents a halophenyl radical containing at least two halogen substituents selected from the group consisting of bromine and chlorine.

2. O-(2,4,5-trichlorophenyl) ethylenediiminophosphinothioate.

3. O-(2,4,6-trichlorophenyl) ethylenediiminophosphinothioate.

4. O-(2,4,6-tribromophenyl) ethylenediiminophosphinothioate.

No references cited.